(12) United States Patent
Fernandez et al.

(10) Patent No.: US 9,382,379 B2
(45) Date of Patent: Jul. 5, 2016

(54) MELT POLYMERIZATION REACTOR SYSTEM AND METHOD

(75) Inventors: Ignacio Vic Fernandez, Santo Angel (ES); Jorge Garcia Agudo, Murcia (ES); Maarten Campman, Roosendaal (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 237 days.

(21) Appl. No.: 14/239,618

(22) PCT Filed: Aug. 17, 2012

(86) PCT No.: PCT/IB2012/054201
§ 371 (c)(1),
(2), (4) Date: Feb. 19, 2014

(87) PCT Pub. No.: WO2013/027165
PCT Pub. Date: Feb. 28, 2013

(65) Prior Publication Data
US 2016/0039971 A1    Feb. 11, 2016

(30) Foreign Application Priority Data
Aug. 19, 2011 (EP) ..................................... 11382282

(51) Int. Cl.
*C08G 64/00* (2006.01)
*C08G 64/06* (2006.01)
*C08G 64/30* (2006.01)
*B01J 19/24* (2006.01)

(52) U.S. Cl.
CPC ................. *C08G 64/06* (2013.01); *B01J 19/24* (2013.01); *C08G 64/307* (2013.01); *B01J 2219/24* (2013.01)

(58) Field of Classification Search
CPC ............................... C08G 64/06; C08G 64/307
USPC ......................................... 528/193, 196, 198
See application file for complete search history.

(56) References Cited

U.S. PATENT DOCUMENTS

| | | | | |
|---|---|---|---|---|
| 4,383,092 A | * | 5/1983 | Ko | ........................... B01J 19/02 526/62 |
| 5,434,227 A | * | 7/1995 | Yamato | ................ C08G 64/307 525/468 |
| 6,323,302 B1 | | 11/2001 | Sasaki et al. | |
| 6,605,686 B2 | | 8/2003 | Takemoto et al. | |
| 7,115,700 B2 | | 10/2006 | Cella et al. | |
| 7,365,149 B2 | | 4/2008 | Brack et al. | |
| 7,482,423 B2 | | 1/2009 | Jansen et al. | |
| 7,547,799 B1 | | 6/2009 | Belfadhel et al. | |
| 7,619,053 B2 | | 11/2009 | Brack et al. | |
| 7,632,913 B2 | | 12/2009 | Campman et al. | |
| 7,671,165 B2 | | 3/2010 | Brack et al. | |
| 2002/0183477 A1 | * | 12/2002 | Takemoto | ............ C08G 64/307 528/196 |
| 2010/0160594 A1 | | 6/2010 | Brack et al. | |

OTHER PUBLICATIONS

Chinese Patent No. 1266443 (A); Publication Date: Sep. 13, 2000; Abstract Only; 2 Pages.
EP Search Report for European Application No. 11382282.9-2102, European Filing Aug. 19, 2011; Date of Mailing Jan. 24, 2012.
International Search Report for International Application PCT/IB2012/054201; International Date of Filing Aug. 17, 2012; Date of Mailing Dec. 20, 2012; 5 pages.
Written Opinion of the International Search Report for International Application PCT/IB2012/054201; International Date of Filing Aug. 17, 2012; Date of Mailing Dec. 20, 2012; 5 pages.

* cited by examiner

*Primary Examiner* — Terressa Boykin
(74) *Attorney, Agent, or Firm* — Cantor Colburn LLP

(57) ABSTRACT

A reactor system for producing polycarbonate includes a surface area in contact with a reaction mixture. The reaction mixture comprises a melt transesterification catalyst, a dihydroxy compound, a diaryl carbonate, and an phenolic byproduct. The surface area in contact with the reaction mixture contains one or more welds joining reactor system parts. All welds in contact with the reaction mixture join reactor system parts made from the same type of metal. If a filler metal is contained in the weld, the filler metal is made from the same type of metal as the metal parts joined by the weld.

14 Claims, 11 Drawing Sheets

MELT POLYMERIZATION REACTOR SYSTEM AND METHOD

CROSS-REFERENCE TO RELATED APPLICATION

This Application is a U.S. National Stage Application of PCT/IB2012/054201 filed Aug. 17, 2012, which claims priority from European Patent Application No. 11382282.9, filed Aug. 19, 2011, both of which are incorporated by reference in their entirety.

BACKGROUND

Polycarbonate is a thermoplastic that has excellent mechanical properties such as impact resistance, heat resistance and transparency. Polycarbonates are widely used in applications ranging from compact discs to automobile parts to transparent security windows.

Color can be generated in polycarbonates and in copolycarbonates which reduces the transparent quality of resulting articles formed from such. The polymerization and molding conditions used to produce the polycarbonate and molded articles may lead to the formation of side reactions within the polycarbonate leading to color formation therein. Greater color formation typically occurs when the molding/polymerization conditions are more abusive and thus polymerization and molding under mild conditions are generally desired.

Color can also be generated by degradation of reaction components or the presence of color bodies or foreign materials in the polycarbonate. Therefore, the quality of the starting materials has a large effect on the color of the polycarbonate product. Additional ways of improving the color of polycarbonate and polycarbonate articles are always desired.

BRIEF SUMMARY OF THE INVENTION

Disclosed herein are reactor systems and methods for producing polycarbonate having superior properties.

In a first embodiment, a melt polymerization reactor system for producing polycarbonate is provided. The reactor system has a surface area in contact with a reaction mixture, wherein:
(I) the reaction mixture comprises a melt transesterification catalyst, a dihydroxy compound, a diaryl carbonate, and a phenolic byproduct,
(II) the surface area in contact with the reaction mixture contains a weld joining metal reactor system parts,
(III) all welds in contact with the reaction mixture join reactor system parts made from the same type of metal, and
(IV) if a filler metal is contained in the weld, the filler metal is made from the same type of metal as the metal parts joined by the weld.

In another embodiment, a method of forming polycarbonate is provided. The method comprises the step of treating a reaction mixture in a melt polymerization reactor system operating under melt polymerization conditions sufficient to produce polycarbonate, wherein:
(A) the reaction mixture comprises a melt transesterification catalyst, a dihydroxy compound, a diaryl carbonate, and a phenolic byproduct, and
(B) the reactor system has a surface area in contact with the reaction mixture, wherein:
(I) the surface area in contact with the reaction mixture contains a weld joining metal reactor system parts,
(II) all welds in contact with the reaction mixture join reactor system parts made from the same type of metal, and
(III) if a filler metal is contained in the weld, the filler metal is made from the same type of metal as the metal parts joined by the weld, thereby forming polycarbonate.

In another embodiment, an additional melt polymerization reactor system for producing polycarbonate is provided. The reactor system comprises one or more reactors having a surface area in contact with a reaction mixture, wherein:
(I) the reaction mixture comprises a melt transesterification catalyst, a dihydroxy compound, a diaryl carbonate, and a phenolic byproduct,
(II) the surface area in contact with the reaction mixture has no welds containing stainless steel.

In another embodiment, an additional melt polymerization reactor system for producing polycarbonate is provided. The reactor system comprises a reactor having a surface area in contact with a reaction mixture, wherein:
(I) the reaction mixture comprises a melt transesterification catalyst, a dihydroxy compound, a diaryl carbonate, and a phenolic byproduct,
(II) the surface area in contact with the reaction mixture contains a weld joining two pieces of stainless steel, wherein the weld is passivated prior to contact with the reaction mixture.

In another embodiment, an additional method of producing polycarbonate is provided. The method comprises:
(A) providing a melt polymerization reactor system, the reactor system comprises a surface area for contact with the reaction mixture, wherein: (I) the surface area in contact with the reaction mixture contains a weld joining two pieces of stainless steel,
(B) passivating the weld, and
(C) after steps (A) and (B), treating a reaction mixture in the melt polymerization reactor system under melt polymerization conditions sufficient to produce polycarbonate, wherein the reaction mixture comprises a melt transesterification catalyst, a dihydroxy compound, a diaryl carbonate, and a phenolic byproduct, and forming the polycarbonate.

In further embodiments, the methods and reactor systems show additional unexpected results where: the diaryl carbonate comprises an ester-substituted diaryl carbonate and the phenolic byproduct comprises an ester-substituted phenol; and/or when the dihydroxy compound comprises a dihydric phenol having the following structure:

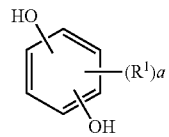

wherein $R^1$ is independently at each occurrence a hydrogen atom, halogen atom, nitro group, cyano group, $C_1$-$C_{20}$ alkyl radical, $C_4$-$C_{20}$ cycloalkyl radical, or $C_6$-$C_{20}$ aryl radical, and a is an integer from 0 to 4.

The present disclosure may be understood more readily by reference to the following detailed description of embodiments and the examples included herein.

DETAILED DESCRIPTION

Figure 1:
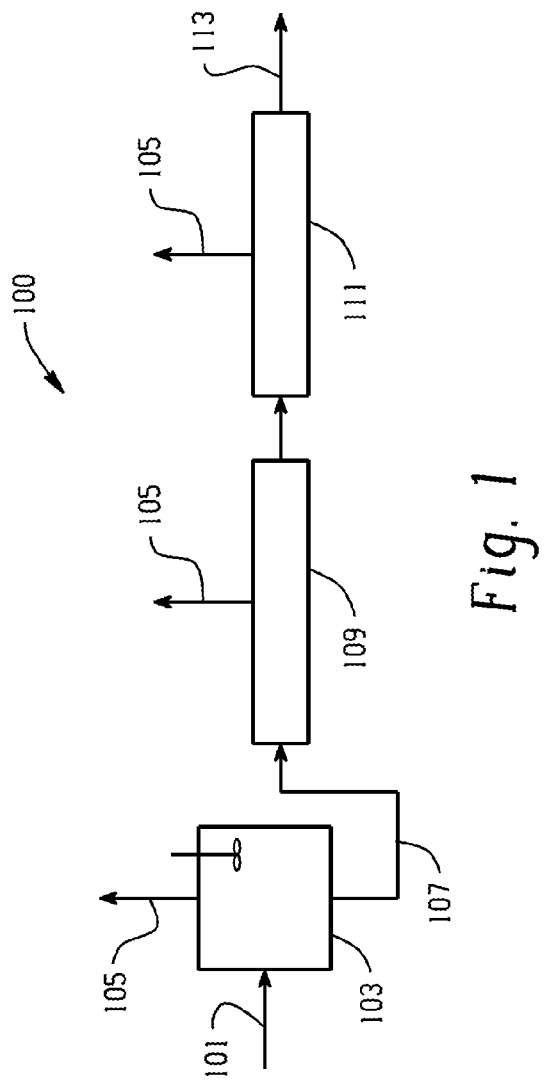
FIG. 1 shows a reactor system with points where welds can be used to join metal parts in a melt polymerization system.

The present disclosure relates, inter alia, to the unexpected discovery that a weld containing stainless steel and/or joining stainless steel pieces, that is in contact with a reaction mixture in a melt polymerization reactor system can lead to formation of color in the product polycarbonate. It has also been found that iron levels in the product polycarbonate are correlated with its color. Without being bound by a particular mechanism, it is believed that iron can be dispersed into a reaction mixture at such a weld point, bead, or area.

It has also been unexpectedly found that certain reaction components within the melt reaction mixture can promote the activity of the welded area and promote the release of iron from a stainless steel weld. For example, as will be further explained and demonstrated below, melt reaction mixtures containing specific diaryl carbonates and/or specific dihydroxy compounds have been found to contain higher than expected concentrations of iron and higher color levels when compared to other reaction mixtures that do not contain these reaction components. Thus it has been found that the reactor systems and methods outlined in the present disclosure show the most benefit when used in connection with specific reaction mixtures.

Definitions:

As used in the specification and claims of this application, the following definitions, should be applied.

"A", "an", and "the" herein do not denote a limitation of quantity, and are to be construed to cover both the singular and the plural, unless otherwise indicated herein or clearly contradicted by context.

The term "polycarbonate" refers to an oligomer or polymer comprising repeat units derived from at least dihydroxy compounds and carbonate compounds. The term "polycarbonate" encompasses poly(carbonate-coester) oligomers and/or polymers. Nothing in the description and claims of this application should be taken as limiting the polycarbonate to only one monomer residue unless the context is expressly limiting. Thus, the application encompasses copolycarbonates with residues of 2, 3, 4, or more types of dihydroxy monomer compounds.

The term "reaction components" is herein understood to mean the materials used to effect a melt transesterification reaction between at least a dihydroxy compound and a diaryl carbonate to produce polycarbonate. These materials include melt transesterification catalyst(s), diaryl carbonate(s), and dihydroxy compound(s).

The suffix "(s)" as used herein is intended to include both the singular and the plural of the term that it modifies, thereby including one or more of that term (e.g., the film(s) includes one or more films).

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The Melt Reaction Mixture:

Polycarbonate can be produced by the melt transesterification reaction of a dihydroxy compound (e.g. bisphenol A) and with a carbonate source in the presence of melt transesterification catalyst. As the reaction proceeds the carbonate source (e.g. a diaryl carbonate) is consumed and a phenolic byproduct is generated. Polymerization takes place in a series of reactors where operating conditions such as temperature and pressure are controlled so that the reaction byproduct, phenol, is removed from reaction components thereby driving the reaction by equilibrium displacement. The reaction mixture in a melt polymerization reactor system will contain a dihydroxy compound(s), a carbonate source such as a diaryl carbonate, a phenolic byproduct, and a melt transesterification catalyst.

A. The Dihydroxy Compound

The dihydroxy monomer compound is not particularly limited. The dihydroxy compound reacts with a diaryl carbonate to form monomer linkages within the polycarbonate chain. It is contemplated that the dihydroxy compound comprises aliphatic and/or aromatic diols and/or acids. Dihydroxy compounds for use in the manufacture of polycarbonate by the melt transesterification process are well known in the art. For example, examples dihydroxy compounds that can be used with the methods and systems disclosed herein are detailed in any of U.S. Pat. Nos. 7,365,149, 7,547,799, 7,619,053, and 7,671,165, which are incorporated herein by reference for all purposes. An often-used dihydroxy monomer compound is bisphenol A (BPA).

It has been herein found that the presence of dihydric phenols can increase reactivity of a weld in contact with the reaction mixture thereby causing an increase in color of the product polycarbonate. Therefore, the present reactor systems and methods can be used with reaction mixtures containing a dihydric phenol. Dihydric phenols that can be used in the reaction mixture include those having the following structure:

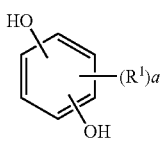

wherein $R^1$ is independently at each occurrence a hydrogen atom, halogen atom, nitro group, cyano group, $C_1$-$C_{20}$ alkyl radical, $C_4$-$C_{20}$ cycloalkyl radical, or $C_6$-$C_{20}$ aryl radical, and a is an integer from 0 to 4. Examples of compounds having this structure include hydroquinone, resorcinol, methylhydroquinone, butylhydroquinone, tertiary butyl hydroquinone, phenylhydroquinone, 4-phenylresorcinol and 4-methylresorcinol.

B. The Diaryl Carbonate and its Phenolic Byproduct:

Diaryl carbonates can be used as the carbonate source in melt polymerization reactions. Specific and non-limiting examples of diaryl carbonates are disclosed in U.S. Pat. Nos. 7,365,149, 7,547,799, 7,619,053, and 7,671,165, discussed and incorporated by reference above.

Of the diaryl carbonates discussed in these patents, non-ester-substituted diaryl carbonates that can be used include for example diphenyl carbonate, ditolyl carbonate, bis(chlorophenyl) carbonate, m-cresyl carbonate, and dinaphthyl carbonate. These patents also discuss the benefit of using activated or ester-substituted diaryl carbonates which increase transesterification reaction rates allowing the melt polymerization reaction to occur in fewer pieces of equipment, at reduced temperature, and/or in minimal residence times. An exemplary list of these ester-substituted diaryl carbonates includes bismethylsalicylcarbonate (BMSC), bisethylsalicylcarbonate, bispropylsalicylcarbonate, bisbutylsalicylcarbonate, bisbenzylsalicylcarbonate, bismethyl 4-chlorosalicylcarbonate and the like. Of these BMSC is often desirable.

As the melt reaction proceeds, the diaryl carbonate is consumed and a phenolic byproduct is generated and removed from the system to drive the reaction toward building polycarbonate molecular weight. The structure of the phenolic byproduct will depend on what diaryl carbonate is employed as the carbonate source. For example, if a non-ester-substituted diarylcarbonate such as diphenyl carbonate (DPC) is employed, a typical phenolic byproduct will be a non-ester-substituted phenol, such as phenol. If an ester-substituted diaryl carbonate such as BMSC is employed, a typical phenolic byproduct will be an ester-substituted phenol such as methyl salicylate.

As discussed above, it has herein been found that use of ester-substituted diaryl carbonates in the melt reaction and the presence of their ester-substituted phenolic byproduct in the reaction mixture can increase the activity of a weld in contact with the reaction mixture thereby causing an increase in color of the product polycarbonate. This increase in weld activity is further exacerbated when an ester-substituted phenolic byproduct and a dihydric phenol are present in the reaction mixture. Therefore, the present reactor systems and methods have been found to be particularly well-suited for use with reaction mixtures containing ester-substituted diaryl carbonates and/or their ester-substituted phenolic byproduct, optionally in the presence of a dihydric phenol.

C. The Melt Transesterification Catalyst:

The reaction mixture also comprises a melt transesterification catalyst. Melt transesterification catalyst are well-known in the art and are not limited. Examples of melt transesterification catalysts are disclosed in U.S. Pat. Nos. 7,365,149, 7,547,799, 7,619,053, and 7,671,165, discussed and incorporated by reference above. These catalysts can include at least one alpha and/or beta catalyst. Beta catalysts are typically volatile and degrade at elevated temperatures. Beta catalysts are therefore often used at early low-temperature polymerization stages. Alpha catalysts are typically more thermally stable and less volatile than beta catalysts and can be used in later high-temperature polymerization stages. However, certain types of beta catalysts are stable along the polymerization process conditions (including the high temperatures and reduced pressures) and can be used solely or also in combination with an alpha catalyst.

Alpha Catalysts:

The alpha catalyst can comprise a source of alkali or alkaline earth ions. The source of these ions includes alkaline earth hydroxides such as magnesium hydroxide and calcium hydroxide. Sources of alkali metal ions include the alkali metal hydroxides illustrated by lithium hydroxide, sodium hydroxide, and potassium hydroxide Alkaline earth metal hydroxides are illustrated by calcium hydroxide and magnesium hydroxide. Of these sodium hydroxide is often used. The alpha catalyst typically will be used in an amount sufficient to provide $1 \times 10^{-2}$ to $1 \times 10^{-8}$, specifically, $1 \times 10^{-4}$ to $1 \times 10^{-7}$ moles of metal hydroxide per mole of the dihydroxy compounds employed.

Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. In one embodiment the alpha catalyst comprises at least one alkali metal salt of a carboxylic acid, at least one alkaline earth metal salt of a carboxylic acid, or combinations thereof. In one embodiment the alpha catalyst comprises $Na_2Mg$ EDTA or a salt thereof.

The alpha transesterification catalyst may also comprise salt(s) of a non-volatile inorganic acid. In one embodiment the alpha catalyst comprises at least one salt of a non-volatile inorganic acid. Salts of non-volatile inorganic acids are illustrated by $NaH_2PO_3$, $NaH_2PO_4$, $Na_2HPO_3$, $KH_2PO_4$, $CsH_2PO_4$, and $Cs_2HPO_4$. The alpha transesterification catalyst may comprise mixed alkali metal salt(s) of phosphoric acid (e.g. $NaKHPO_4$, $CsNaHPO_4$, and $CsKHPO_4$). The alpha catalyst may also comprises mixed alkali metal salt(s) of carbonic acid (e.g. $Cs_2CO_3$).

Beta Catalysts:

Beta catalysts can, for example, comprise a quaternary ammonium compound, a quaternary phosphonium compound, or a combination comprising at least one of the foregoing. The quaternary ammonium compound can be an organic ammonium compound having the structure,

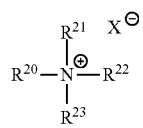

wherein $R^{20}$-$R^{23}$ are independently a $C_1$-$C_{20}$ alkyl radical, $C_4$-$C_{20}$ cycloalkyl radical, or a $C_6$-$C_{20}$ aryl radical; and $X^-$ is an organic or inorganic anion, or combinations thereof. In one embodiment anion $X^-$ is selected from at least one of the following: hydroxide, halide, carboxylate, sulfonate, sulfate, formate, carbonate, and bicarbonate.

Non-limiting examples of organic quaternary ammonium compounds are tetramethyl ammonium hydroxide, tetrabutyl ammonium hydroxide, tetramethyl ammonium acetate, tetramethyl ammonium formate, and tetrabutyl ammonium acetate. In one embodiment, the quaternary phosphonium compound is an organic phosphonium compound having the structure,

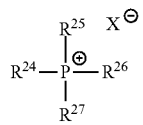

wherein $R^{24}$-$R^{27}$ are independently a $C_1$-$C_{20}$ alkyl radical, $C_4$-$C_{20}$ cycloalkyl radical, or a $C_6$-$C_{20}$ aryl radical; and $X^-$ is an organic or inorganic anion, or combinations thereof. In one embodiment, anion $X^-$ is an anion selected from at least one of the following: hydroxide, halide, alkoxide, aryloxide, carboxylate, sulfonate, sulfate, formate, carbonate, and bicarbonate. Examples of organic quaternary phosphonium compounds are illustrated by tetramethyl phosphonium hydroxide, tetramethyl phosphonium acetate, tetramethyl phosphonium formate, tetrabutyl phosphonium hydroxide, and tetraphenyl phosphonium phenoxide. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $\frac{1}{2}(CO_3^{-2})$.

The amount of beta catalyst employed is typically based upon the total number of moles of dihydroxy compound employed in the polymerization reaction. When referring to the ratio of beta catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range of $1\times10^{-2}$ to $1\times10^{-5}$, specifically $1\times10^{-3}$ to $1\times10^{-4}$ moles per mole of the dihydroxy compounds in the reaction mixture.

The Reactor Systems and Methods:

Melt transesterification production processes are well known in the art for producing polycarbonate by reacting a diaryl carbonate and a dihydroxy compound in the optional presence of catalysts. Typically a melt polymerization reactor system comprises an oligomer forming section and polymer molecular weight building section. The types of equipment used in each these sections are not particularly limited and may include for example mixing devices, stirred or unstirred vessels or reactors, kneaders, extruders, compounders, heat exchangers, flash tanks, transfer pipes, and the like. Examples of melt polymerization reaction systems and operating conditions are also disclosed in U.S. Pat. Nos. 7,365,149, 7,547,799, 7,619,053, and 7,671,165, discussed and incorporated by reference above.

After reading the present disclosure, one skilled in the art will be able to readily select acceptable operating conditions and specific reaction equipment for the reactor systems and methods herein described. For example standard operating temperatures of reactor equipment in a melt production facility can be 50° C. to 500° C. The higher the temperature, the faster the polymerization reaction. However, one skilled in the art will understand that as temperature increases undesired reaction byproducts may be formed and incorporated within the product polycarbonate and reaction components can be degraded. In some embodiments the melt polymerization conditions sufficient to produce polycarbonate include temperatures of 100° C. to 400° C. (e.g. 125° C. to 350° C., for example 150° C. to 325° C.).

In one embodiment, a melt polymerization reactor system for producing polycarbonate has a surface area in contact with a reaction mixture described above. The surface area in contact with the reaction mixture contains weld(s) joining metal reactor system parts. All welds in contact with the reaction mixture join reactor system parts are made from the same type of metal. If a filler metal is contained in the weld, the filler metal is made from the same type of metal as the metal parts joined by the weld.

In another embodiment, a method using any of the reactor systems described herein is provided. The method includes the step of treating a reaction mixture in any of the melt polymerization reactor systems described herein under melt polymerization conditions sufficient to produce polycarbonate.

In another embodiment, a further melt polymerization reactor system for producing polycarbonate is provided. In this embodiment the reactor system also has a surface area in contact with a reaction mixture described above. The surface area in contact with the reaction mixture has no welds containing stainless steel.

In some of these embodiments, the reactor systems will have a surface area in contact with a reaction mixture wherein the surface area does not contain any welds joining stainless steel reactor system parts with other reactor system parts. In these embodiments the surface area in contact with the reaction mixture may contain no welds, or in the alternative, only welds joining/containing reactor system parts made of non-stainless steel materials (e.g. tantalum, chromium, and/or nickel).

In other embodiments, the reactor systems will have a surface area in contact with the reaction mixture which has two similar metals welded together (e.g. stainless steel to stainless steel, nickel to nickel, tantalum to tantalum, chromium to chromium, etc.). In these embodiments, it has been found that if a filler metal is used in forming the weld, then the filler metal should also be made of the same type of metal as the reactor system parts to be welded.

In the embodiments where the reactor system's surface area in contact with the reaction mixture contains a stainless steel to stainless steel weld it has been found that the weld should be passivated prior to contact with the reaction mixture. Welds containing a stainless steel reactor system part welded with a reactor system part made from a different metal (e.g. nickel) have been found to degrade upon passivation treatment with a strong acid (e.g. nitric acid). Therefore, a weld containing a stainless steel and a different metal (e.g. nickel) have been found to be not particularly suited for reactor systems disclosed herein. In the alternative, reactor systems can have welds joining reactor system parts, and optionally a filler metal, made from the same type of metals (e.g. an unblended weld). For example, a reactor system may have a surface area in contact with a reaction mixture, where the surface area has a weld joining two stainless steel reactor system parts, and optionally a stainless steel filler metal. In this situation, the weld can be passivated with a strong acid such as nitric acid without degradation of the weld or the melt reactor system parts. In another example, a reactor system may have a surface area in contact with a reaction mixture, where the surface area has a weld joining two nickel reactor system parts. In this situation, no passivation of the weld is required since stainless steel is not part of the weld pool.

Passivation treatment is where the weld area or bead and optionally the entire surface area in contact with the reaction mixture is covered with an oxide film, creating a tight, stable protective covering and protecting the metal from the components in the reaction mixture. Acceptable passivation treatments include those where the weld area or weld bead, and optionally the entire surface area in contact with the reaction mixture, is contacted with a solution containing nitric acid or some other strong oxidant.

The methods disclosed herein may include the physical steps of providing a reactor system and the physical inspection thereof prior to introduction of reaction components. Where the physical inspection reveals a surface area to be in contact with the reaction mixture having a weld joining two pieces of stainless steel, the method may include the step of passivation of the weld. Where the physical inspection reveals a surface area to be in contact with the reaction mixture having a weld joining stainless steel and nickel or two other dissimilar metals, the method may include the step of removing the system component (e.g. reactor, transfer line, heat exchanger, extruder, purifier, etc.) from the reactor system and introducing a replacement system component having no welds or in the alternative only welds joining similar metals.

FIG. 1 shows an exemplary melt polymerization reactor system 101 having a surface area in contact with a melt polymerization reaction mixture where welds joining reactor system parts might be found. Welds joining reactor system parts might be found, for example, in and/or between: the reaction components feed line 101; the oligomerization tank and mixing propeller 103; the oligomer transfer line 107; the first 109 and second 111 polymerizers or the transfer line therebetween; the product polycarbonate line 113; and/or any of the phenolic by streams 105.

Examples of the Embodiments

In an embodiment, A melt polymerization reactor system for producing polycarbonate comprises a surface area in contact with a reaction mixture, wherein (I) the reaction mixture comprises a melt transesterification catalyst, a dihydroxy compound, a diaryl carbonate, and a phenolic byproduct, (II) the surface area in contact with the reaction mixture contains a weld joining metal reactor system parts, (III) all welds in contact with the reaction mixture join reactor system parts made from the same type of metal, and (IV) if a filler metal is contained in the weld, the filler metal is made from the same type of metal as the metal parts joined by the weld.

In another embodiment, a melt polymerization reactor system for producing polycarbonate comprises a surface area in contact with a reaction mixture, wherein (I) the reaction mixture comprises a melt transesterification catalyst, a dihydroxy compound, a diaryl carbonate, and a phenolic byproduct, (II) the surface area in contact with the reaction mixture has no welds containing stainless steel.

In another embodiment, a melt polymerization reactor system for producing polycarbonate comprises a surface area in contact with a reaction mixture, wherein (I) the reaction mixture comprises a melt transesterification catalyst, a dihydroxy compound, a diaryl carbonate, and an phenolic byproduct, (II) the surface area in contact with the reaction mixture contains a weld joining two pieces of stainless steel, wherein the weld is passivated prior to contact with the reaction mixture.

In another embodiment, a method of forming polycarbonate comprises treating a reaction mixture in a melt polymerization reactor system operating under melt polymerization conditions sufficient to produce polycarbonate, and forming the polycarbonate; wherein:
(A) the reaction mixture comprises a melt transesterification catalyst, a dihydroxy compound, a diaryl carbonate, and a phenolic byproduct, and
(B) the reactor system comprises a surface area in contact with the reaction mixture, wherein:
(I) the surface area in contact with the reaction mixture contains a weld joining metal reactor system parts,
(II) all welds in contact with the reaction mixture join reactor system parts made from the same type of metal, and
(III) if a filler metal is contained in the weld, the filler metal is made from the same type of metal as the metal parts joined by the weld.

In another embodiment, a method of forming polycarbonate comprises (A) providing a melt polymerization reactor system, the reactor system comprises a surface area for contact with the reaction mixture, wherein:
(I) the surface area in contact with the reaction mixture contains a weld joining two pieces of stainless steel,
(B) passivating the weld, and
(C) after steps (A) and (B), treating a reaction mixture in the melt polymerization reactor system under melt polymerization conditions sufficient to produce polycarbonate, wherein the reaction mixture comprises a melt transesterification catalyst, a dihydroxy compound, a diaryl carbonate, and a phenolic byproduct; and forming the polycarbonate.

In the various embodiments, (i) the surface area in contact with the reaction mixture has no welds containing stainless steel; and/or (ii) the weld joins two reactor system parts made from stainless steel, and the weld is passivated prior to contact with the reaction mixture; and/or (iii) the weld joins two reactor system parts made from nickel; and/or (iv) the treating of the reaction mixture in a melt polymerization reactor system operating under melt polymerization conditions, is performed at a temperature of 100° C. to 400° C.; and/or (v) the dihydroxy compound comprises a dihydric phenol having the structure

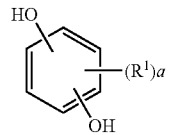

wherein $R^1$ is independently at each occurrence a hydrogen atom, halogen atom, nitro group, cyano group, $C_1$-$C_{20}$ alkyl radical, $C_4$-$C_{20}$ cycloalkyl radical, or $C_6$-$C_{20}$ aryl radical, and a is an integer from 0 to 4; and/or (vi) the dihydric phenol comprises hydroquinone, resorcinol, methylhydroquinone, butylhydroquinone, tertiary butyl hydroquinone, phenylhydroquinone, 4-phenylresorcinol, 4-methylresorcinol, or a combination comprising at least one of the foregoing; and/or (vii) the diaryl carbonate comprises an ester-substituted diaryl carbonate and the phenolic byproduct comprises an ester-substituted phenol; and/or (viii) the ester-substituted diaryl carbonate comprises bismethylsalicylcarbonate and the ester-substituted phenol comprises methyl salicylate, and wherein the dihydric phenol comprises hydroquinone, resorcinol, methylhydroquinone, butylhydroquinone, tertiary butyl hydroquinone, phenylhydroquinone, 4-phenylresorcinol, 4-methylresorcinol, or a combination comprising at least one of the foregoing; and/or (ix) the ester-substituted diaryl carbonate comprises bismethylsalicylcarbonate and the ester-substituted phenol comprises methyl salicylate.

EXAMPLES

Having described the systems and methods in detail, the following examples are provided. The examples should not be considered as limiting the scope, but merely as illustrative and representative thereof.

In the following examples different techniques were used to analyze results. In some situations Box Plots were used to depict results. Box Plots are a graphical representation of an analysis of variance (ANOVA), which tests the hypothesis that the means of two or more populations are equal. ANOVAs evaluate the importance of one or more factors by comparing the response variable means at the different factor levels. The null hypothesis states that all population means (factor level means) are equal while the alternative hypothesis states that at least one is different. To run an ANOVA, you must have a continuous response variable and at least one categorical factor with two or more levels. ANOVAs require data from normally distributed populations with roughly equal variances between factor levels. If the p-value is less than the alpha (typically 0.05), then the null hypothesis can be rejected.

The name "analysis of variance" is based on the manner in which the procedure uses variances to determine whether the means are different. The procedure works by comparing the variance between group means versus the variance within groups as a method of determining whether the groups are all part of one larger population or separate populations with different characteristics.

Example 1

Figure 2:
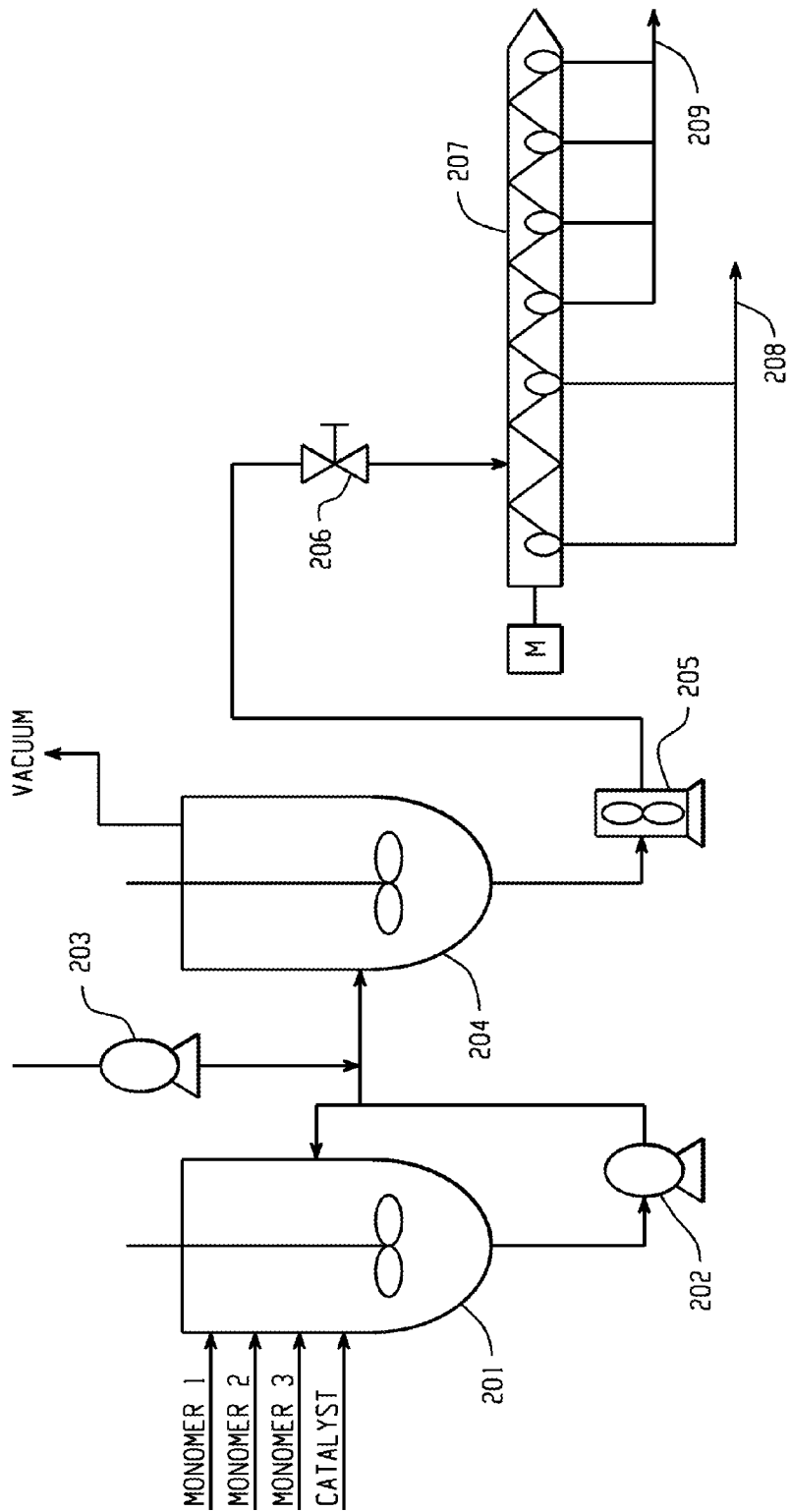
FIG. 2 shows a melt polymerization reaction system as used in Example 1.

A terpolymer based upon dihydroxy compounds including bisphenol A, hydroquinone, and methyl-hydroquinone was prepared in a continuous reactor system shown in FIG. 2. The reactor system shown in FIG. 2 is operated under melt polymerization conditions sufficient to produce polycarbonate. The melt polymerization conditions include temperatures of 100° C. to 400° C. (e.g. 125° C. to 350° C., for example 150° C. to 325° C.). Dihydroxy monomers (bisphenol A, hydroquinone, methyl-hydroquinone and bis-methylsalicyl carbonate) and melt transesterification catalyst are continuously fed into a first continuously stirred tank reactor (CSTR) oligomerization reactor (201). This reactor is typically operated at or near atmospheric pressure and at temperatures of 100° C. to 300° C. (e.g. 150° C. to 200° C.). The reaction mixture is then pumped using a pump (202) into a second CSTR (204). Optionally, additional BMSC is added to the inlet of (204) by means of additional BMSC pump (203). The flow rate of additional BMSC is not limited but typically amounts to between 0.5% and 10% of the flow rate of BMSC added to (201).

The temperature in reactor (204) is typically higher than in reactor (201) (e.g. 170° C. to 230° C.). The pressure in (204) is typically lower than in (201), 10 kiloPascals (kPa) to 50 kPa. Hence, methyl salicylate produced as a byproduct during the oligomerization reaction is partially removed from reactor (204) and condensed against cooling water. As a result, the reaction progresses by reaction equilibrium displacement. By means of gear pump (205) the mixture exiting (204) is continuously pumped to extruder (207) where it is reactively extruded. It is noted that extruder (207) could be replaced with a different type of reactor (e.g. a LVP polymerizer).

The feed line to the extruder (207) contains a flash valve (206) operable to maintain a sufficiently high pressure upstream so as to avoid boiling in the mixture. Extruder (207) is a ZSK58 13-barrel twin-screw extruder (length to diameter (L/D) ratio of 59). The extruder is equipped with six vacuum vents. The backvent and the first forward vent are connected to the lo-vac system (208), the other forward vents are connected to the hi-vac system (209). It is believed that removal of the methyl salicylate by devolatilization and completion of the polymerization reaction occurs in the reactive extruder at temperatures of 270-305° C. and vacuum (0.2-3 kPa). The removed methyl salicylate is condensed against cooling water. Polymer product from the reactive extrusion is passed through a die and cooled in a water bath to yield continuous strands of polymer. Alternatively, oligomer stream out of reactor 204 can be fed to a different polymerizer (horizontal or vertical).

Reactor 201 is a CSTR made from nickel grade Ni200 with piping inlets in SS316L welded to the Ni200 using SS314L as filler element/metal. Reactor 204 is formed in two portions (e.g. a top and bottom portion). Each portion is made of nickel grade Ni200 with a body flange made from SS316L welded to the Ni200 using SS314L as filler metal. Piping inlets are in SS316L and welded to Ni200 using the same filler material. The polymerizing extruder 207 is made of stainless steel. Pipes and instrumentation in the process are made of stainless steel.

Figure 9:
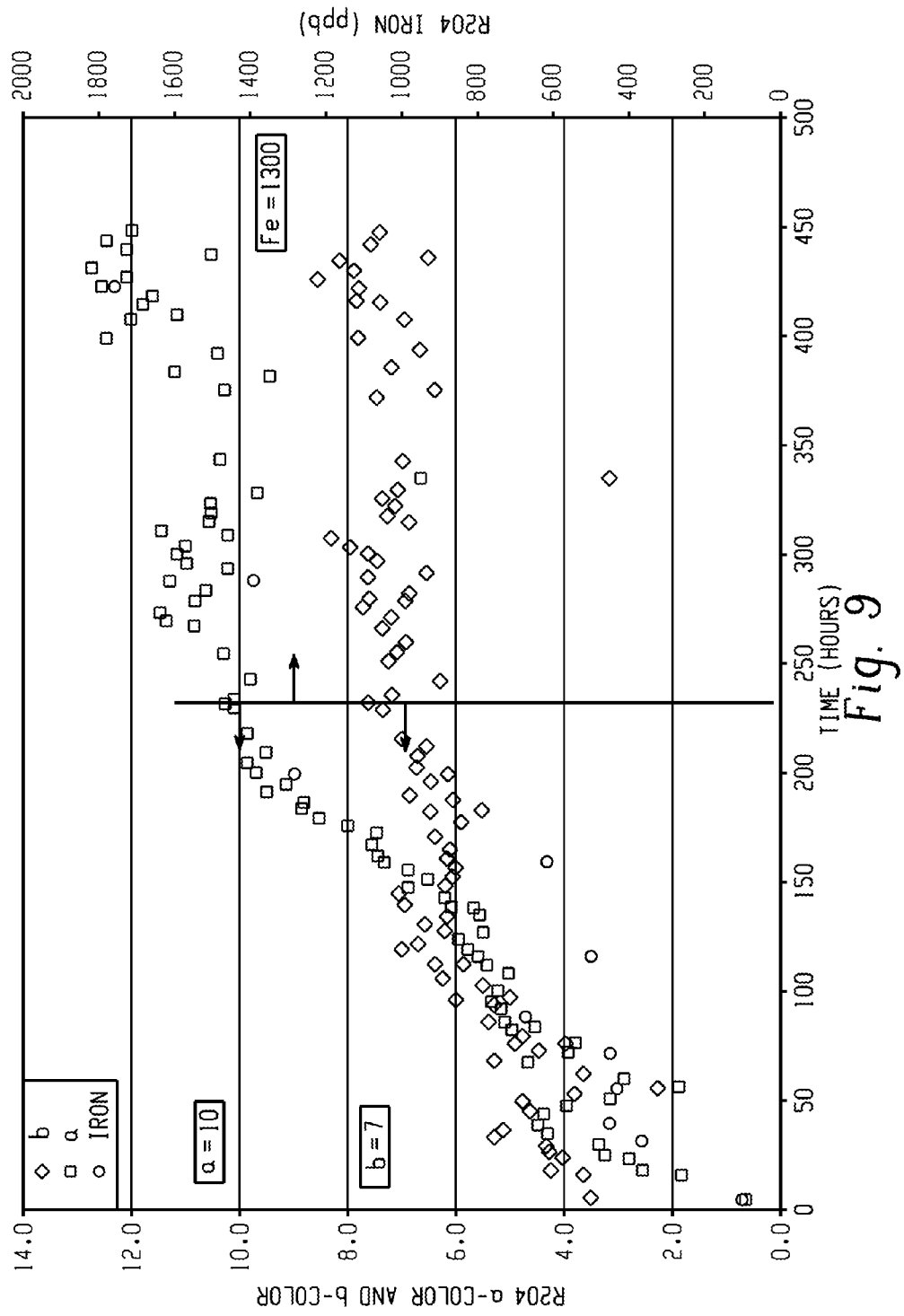
FIG. 9 shows results from Example 1 of the Example section.

During production of terpolymers an unexpected discoloration in both the final polycarbonate and reactor 204 oligomer samples was observed. See FIG. 9. It was surprisingly found that the color in both the oligomer in reactor 204 and product polycarbonate correlated strongly with the iron content of the sample.

Figure 3:
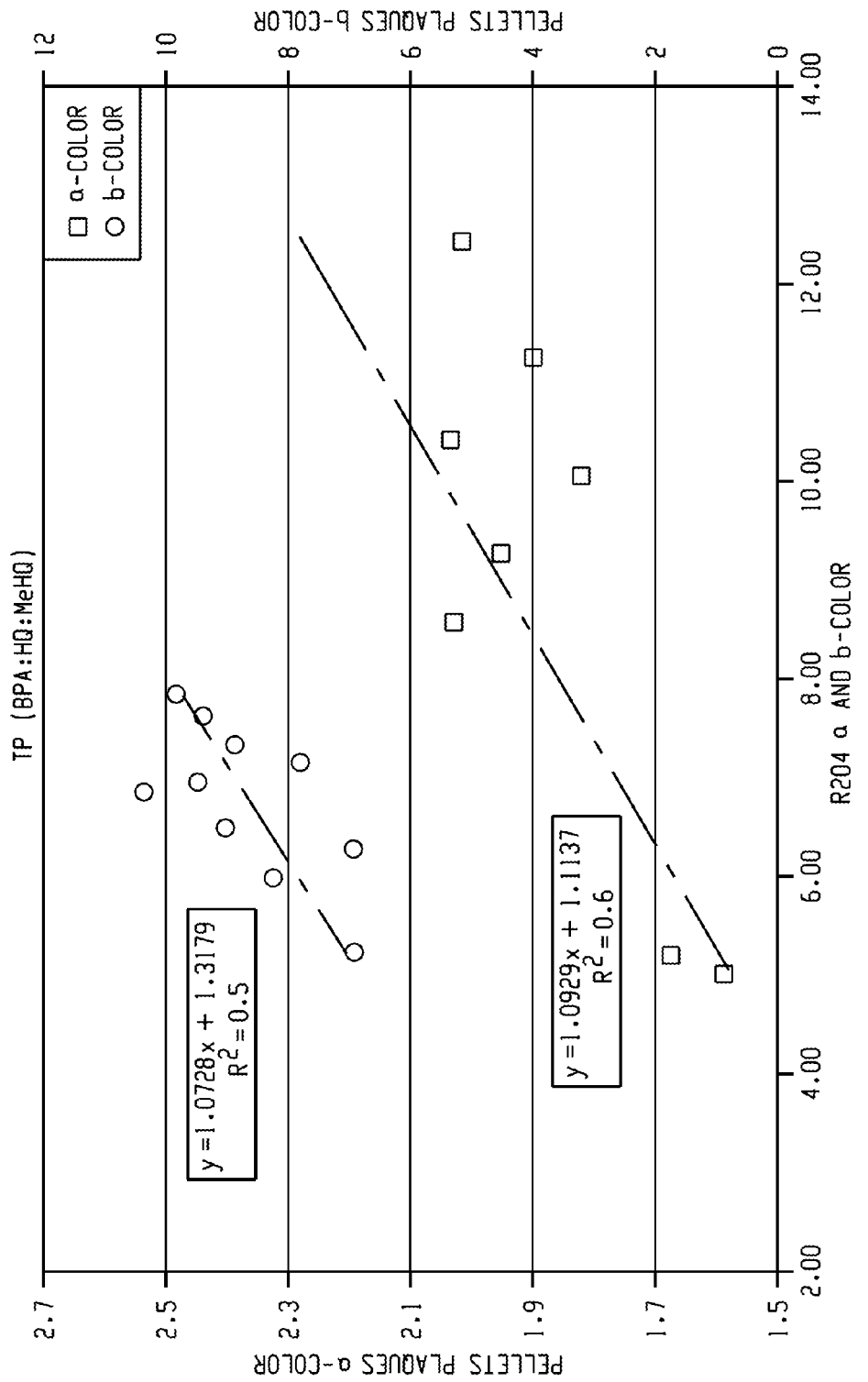
FIG. 3 shows results from Example 1 in the Example section.
Figure 4:
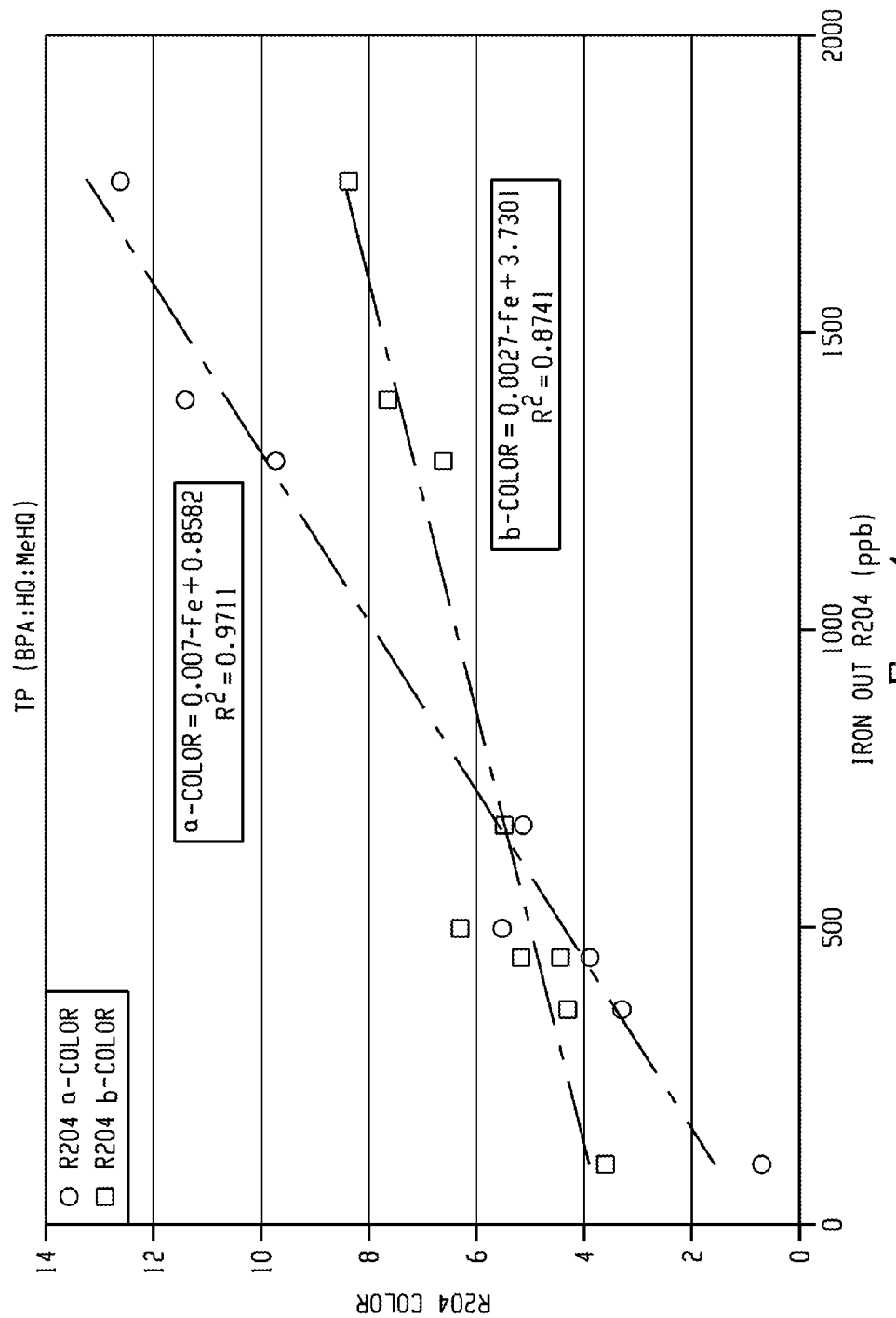
FIG. 4 shows results from Example 1 in the Example section.

The color of molded 2.5 mm thick plaques were measured in the transmission mode using a Gretag-MacBeth 7000A spectrometer according to the CIE laboratory standard. A D65 light source was used with a 10° observation angle. FIG. 3 shows the correlation between the CIE Lab a and b color of the final polycarbonate and the color of the oligomer samples from reactor 204. FIG. 4 shows the surprising and strong correlation between the iron concentration in the oligomer and its color. Dependence of oligomer and final product color was seen both in terms of the b-color scale (yellowness) and the a-color scale (redness).

Color was measured with a Gretag-Mactbeth 7000A spectrometer using the light source D65 with a 10° observation angle. Since samples were opaque, color values were obtained from the light reflected in 10 mm thick solid plaques obtained out of the reactor outlet stream. Reported values are an average of 5 replicates.

Example 2

Example 1 can be repeated using different reactor assemblies for reactors 201 and 204 in accordance with the teachings of the present disclosure. For example the materials of construction of these reactors and transfer lines connected thereto can be made from nickel or stainless steel and contain no blended welds. Oligomer samples and product terpolymers produced in these reactor systems will contain improved color.

Example 3

Figure 10:
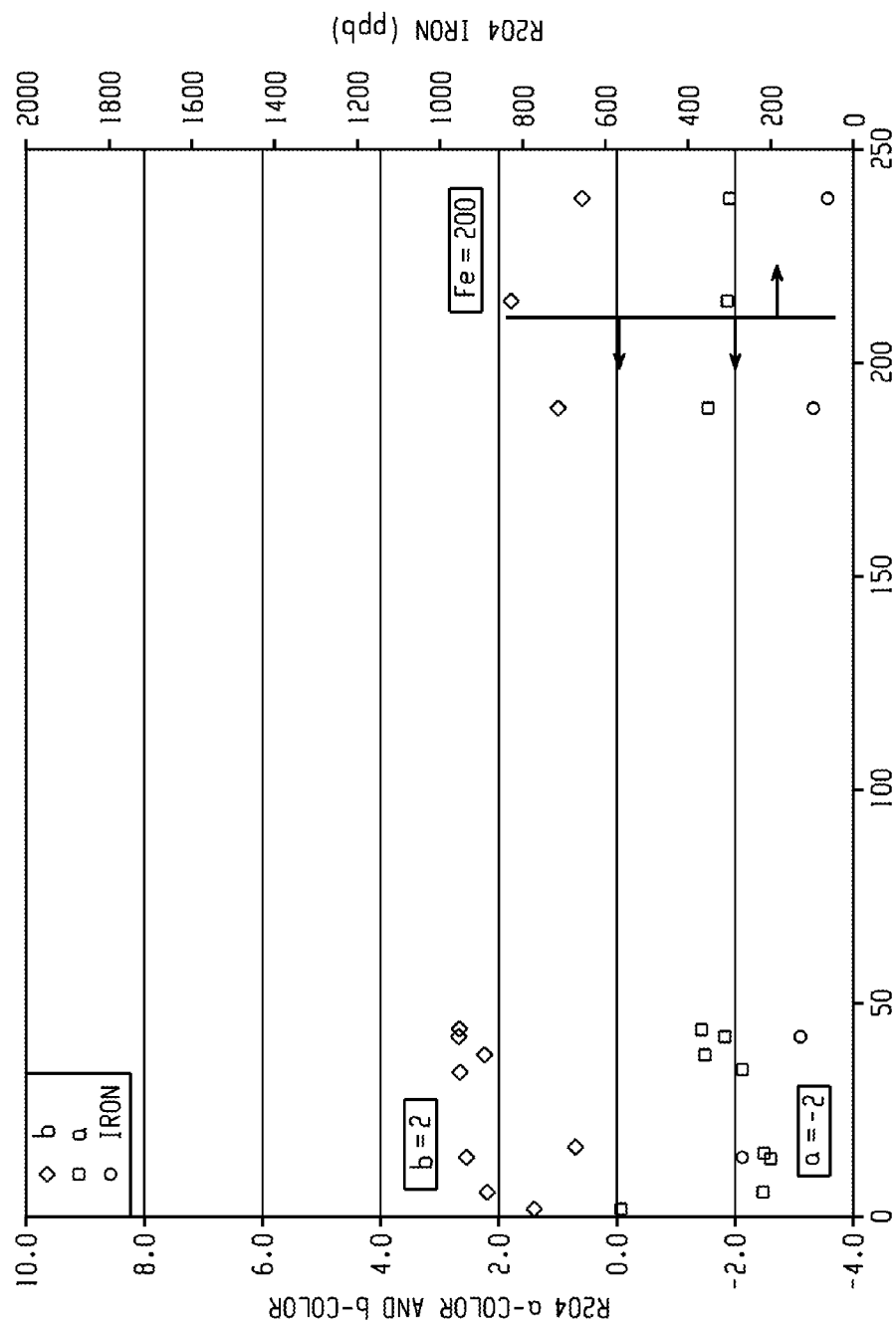
FIG. 10 shows results from Example 3 of the Example section.

Example 1 was repeated with a different reactor assembly for reactor 204. Instead of using reactor 204 as described in Example 1, reactor 204 was made of bulk stainless steel SSS316L with all pipe inlets/outlets in SS316L welded to the vessel with SS314L as filler. During production of terpolymers using the reactor 204 of this example no discoloration in either the final polycarbonate or reactor 204 oligomer samples was observed. See FIG. 10.

Example 4

In the aim of understanding the possible chemical interaction that was taking place between the materials of construction of reactor 204 in Example 1 and the reaction media, a series of laboratory experiments were conducted. CIE Lab a and b color value results are shown in FIGS. 5 and 6.

Figure 5:
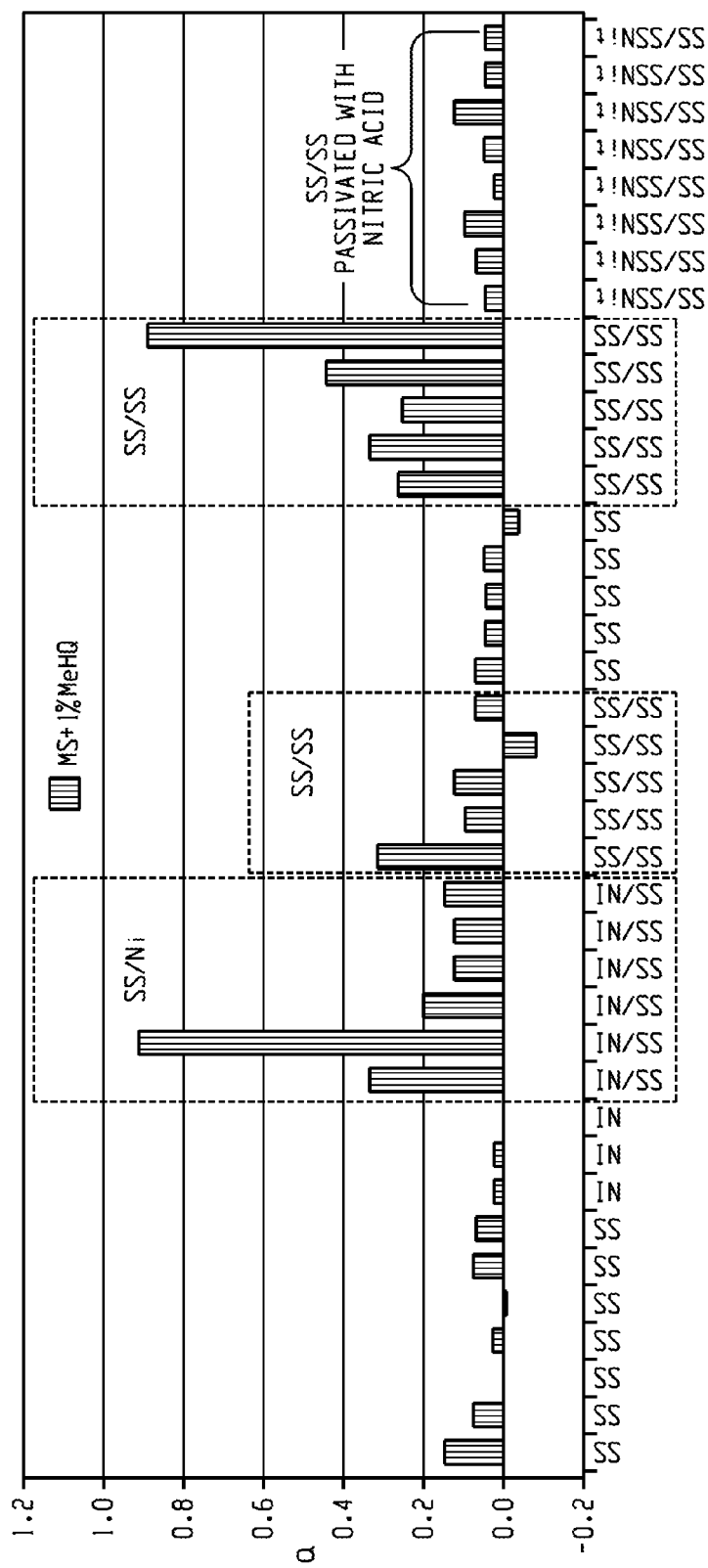
FIG. 5 shows results from Example 4 in the Example section.
Figure 6:
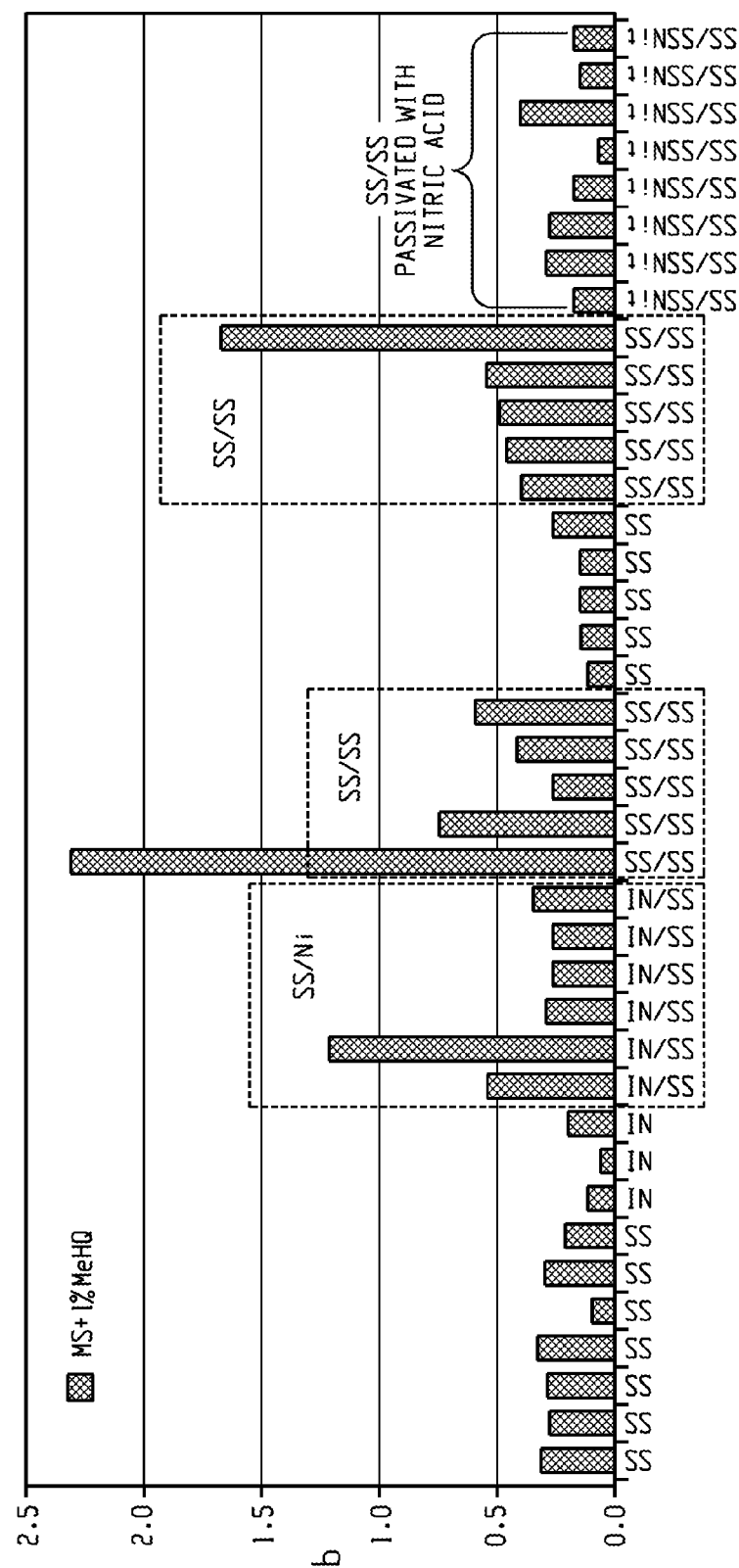
FIG. 6 shows results from Example 4 in the Example section.

As shown from left to right in FIGS. 5 and 6, the experiments included multiple sample measurements from a beaker containing methyl salicylate with 1 wt % of methyl hydroquinone and: (1) a single coupon of SS; (2) a single coupon of nickel-Ni200-; (3) a nickel coupon welded to stainless steel coupon-316 grade-; (4) two Stainless Steel coupons-316 grade-, welded together; (5) another coupon of stainless steel-316 grade-, (6) another two stainless steel coupons-316 grade-, welded together; and finally (7) two stainless steel coupons-316 grade-, welded together, where after welding the welded piece was passivated using nitric acid solution. All single coupons of stainless steel were passivated with citric acid solution to remove metal debris from cutting, stamping, and welding processes, prior to use in the experiments (e.g. experiments (1) and (5)) and prior to welding (e.g. experiments (3), (4), and (6)). The welded coupons used in experiments (3), (4), and (6) were not exposed to nitric acid prior to the exposure experiments. Only the welded coupon in experiments (7) was exposed after welding to the nitric acid passivation treatment.

Unless stated to the contrary, all single coupons and welded coupons were passivated with citric acid prior to their usage. Passivation with citric acid consisted on washing the metal pieces with a 40% aqueous solution of citric acid for 72 hours (hr) at room temperature. After exposure, coupons were dried with acetone.

Nitric acid passivation was accomplished by immersion into a 20% aqueous solution of nitric acid for 24 hr at room temperature. The solution was continuously stirred and blanketed with nitrogen. Coupons were dried with pure acetone before usage.

Exposure experiments were carried out at 200-220° C. for 2 hours at atmospheric pressure with a continuous nitrogen purge.

FIGS. 5 and 6 show the series of exposure experiments. Variables represented are the a and b color of the methyl salicylate solution, obtained by the solution YI method, after 2 hours exposure. Data indicate that higher color values are obtained when methyl salicylate is exposed to welded coupons of either nickel+stainless steel or welded coupons of stainless steel+stainless steel which were not passivated with nitric acid prior to exposure. "Solution Yellowness Index" refers to the yellowness of the reaction mixture prior to substantial polymerization. Data can be measured with a UV/VIS spectrophotometer on a 10% Copolymer solution in methyl chloride ($MeCl_2$). The transmission can be measured on 3 wavelengths (445 nanometers (nm), 555 nm, and 600 nm) against a $MeCl_2$ blank. With the following calculation the sol YI can be calculated;

(Sol YI=(% $T600$−% $T445$)/% $T555$*100%).

The data in FIGS. 5 and 6 shows that higher color levels occur when the methyl salicylate is exposed to stainless steel welds that have not been treated with nitric acid prior to exposure. This occurs even though the stainless steel coupons, after welding, were passivated with citric acid. The nickel coupons do not contain iron and there is no corresponding color increase when these coupons are exposed. Furthermore, it has been found that nickel degrades when exposed to strong acids such as nitric acid. Therefore, welded coupons of nickel and stainless steel cannot be passivated.

Example 5

Figure 7A:
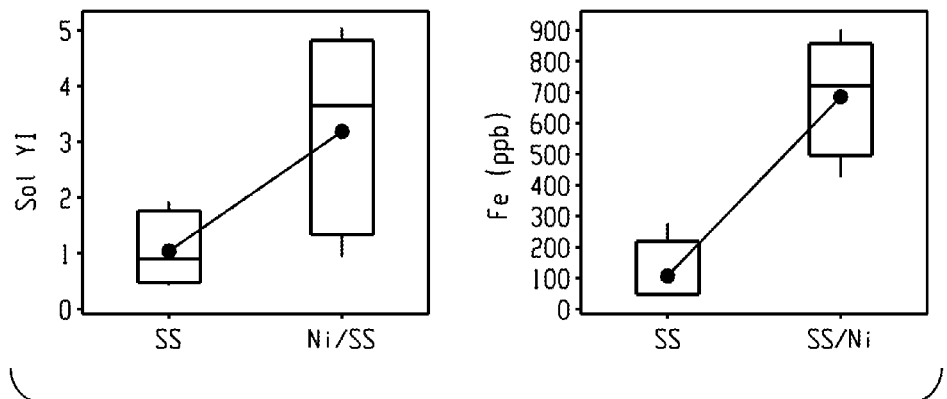
FIGS. 7a and 7b shows results from Example 5 in the Example section.
Figure 7B:
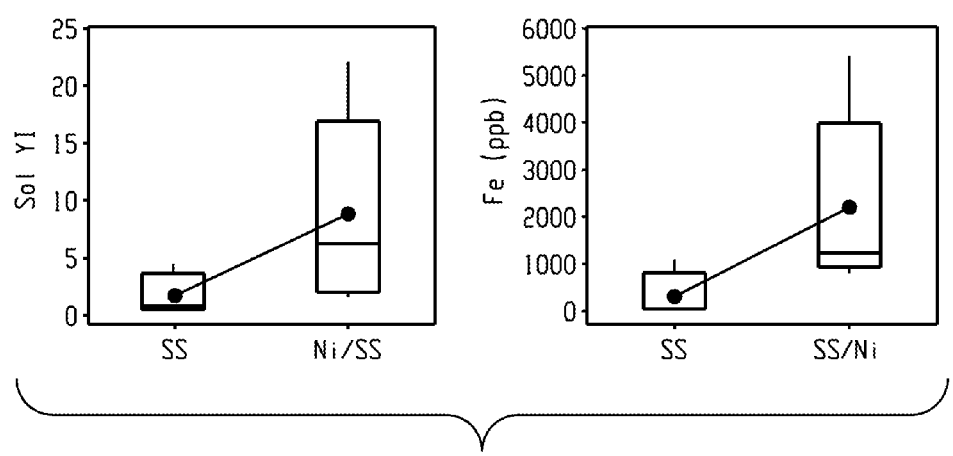

Similar exposure experiments to Example 4 were conducted in Example 5. FIGS. 7a and 7b show box plot comparisons between the Sol YI values and the iron levels measured in methyl salicylate samples alone (FIG. 7a) and methyl salicylate with 1 wt % methyl hydroquinone (MeHQ) (FIG. 7b) exposed to different coupons. In FIG. 7a three samples were used: (1) a coupon of stainless steel that was passivated with citric acid prior to exposure; (2) a coupon of nickel that was passivated with citric acid prior to exposure; and (3) a coupon of nickel welded to a coupon of stainless that was passivated after welding and prior to exposure with citric acid.

Figure 8:
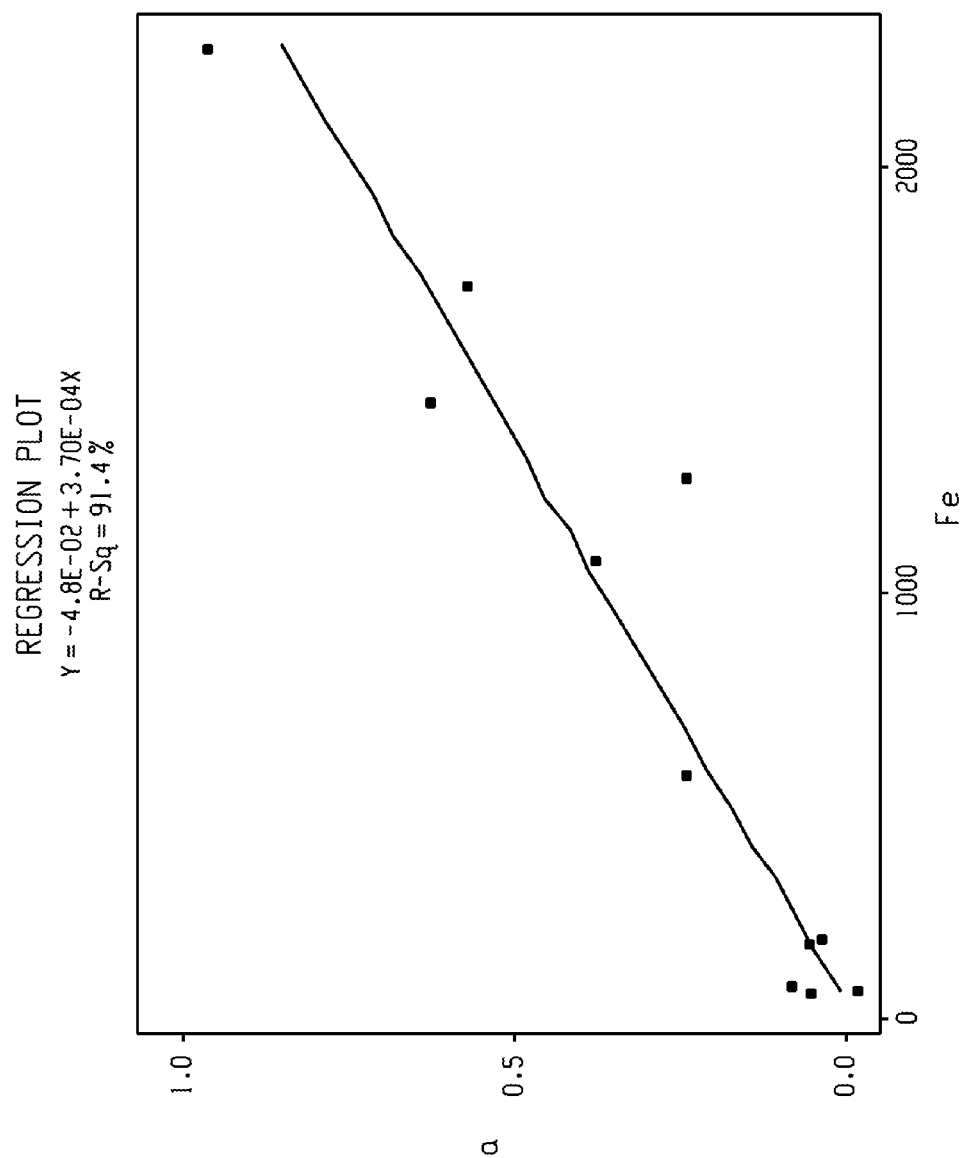
FIG. 8 shows results from Example 5 in the Example section.

The data shown in FIGS. 7(a) and (b) demonstrates at least two different phenomena. First, a weld containing stainless steel releases more iron into solution which correlates to greater solution yellowness index (YI) than does a piece of stainless containing no weld. FIG. 8 shows a regression plot demonstrating the correlation between iron content and the CIE Lab "a" color value of solutions from experiments of nickel+stainless steel welded coupons exposed to methyl salicylate with 1 wt % MeHQ. Second a reaction mixture containing dihydric phenol causes greater release of iron from both non-welded and welded stainless steel.

Example 6

Experiments similar to Example 4 were conducted on nickel/stainless steel welded coupon samples. In these experiments phenol (e.g. the phenolic reaction byproduct of DPC) was used instead of methyl salicylate (e.g. the phenolic reaction byproduct of the ester-substituted diaryl carbonate BMSC). The results of the exposure experiments are depicted in FIGS. 11a and 11b.

Figure 11A:
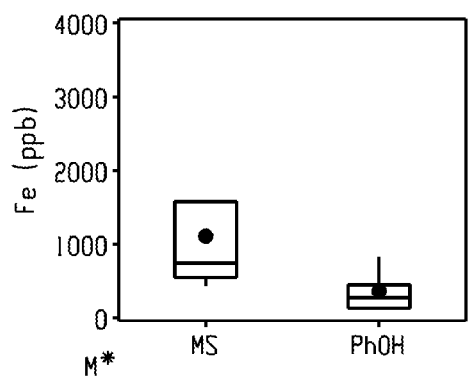
FIGS. 11a, 11b, 12a, and 12b show results from Example 6 of the Example section.
Figure 11B:
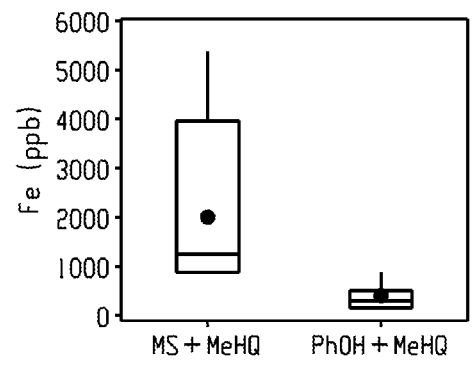

FIG. 11a shows iron levels obtained in coupons of nickel welded to stainless steel which were passivated with citric acid after welding and prior to exposure to methyl salicylate and phenol. FIG. 11b shows similar type of data when 1 wt % MeHQ is also present with the byproduct.

Figure 12A:
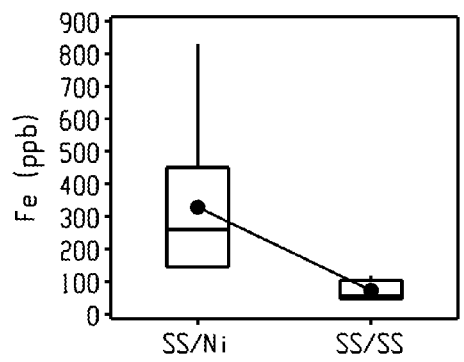
Figure 12B:
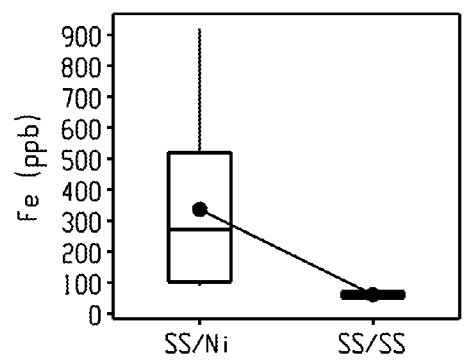

FIG. 12a shows iron levels obtained when either a coupon of stainless steel welded with a coupon of nickel or two coupons of stainless steel welded together, all of them passivated with citric acid prior to their usage, were exposed to phenol. Similarly, FIG. 12b shows iron levels when 1 wt % was included with the phenol.

The results shown in these Figures demonstrate at least three separate phenomena. First, iron is released into solution from the nickel/stainless steel weld regardless of what diaryl carbonate/phenolic byproduct is present in the mixture. Second, when an ester-substituted diaryl carbonate is used in the reaction mixture, its ester-substituted phenolic by-product creates greater weld activity, higher release of iron from the weld, and great color in the product polycarbonate. Third, the presence of both ester-substituted phenol and a dihydric phenol in the reaction mixture further exacerbates the activity of the weld, increases the release of iron from the weld, and increases color in the product polycarbonate.

In an embodiment, a melt polymerization reactor system for producing polycarbonate comprises a surface area in contact with a reaction mixture. The reaction mixture comprises a melt transesterification catalyst, a dihydroxy compound, a diaryl carbonate, and a phenolic byproduct. The surface area in contact with the reaction mixture contains a weld joining metal reactor system parts. All welds in contact with the reaction mixture join reactor system parts made from the same type of metal. If a filler metal is contained in the weld, the filler metal is made from the same type of metal as the metal parts joined by the weld.

In an embodiment, a method of forming polycarbonate can comprise: treating a reaction mixture in a melt polymerization reactor system operating under melt polymerization conditions sufficient to produce polycarbonate, and forming the polycarbonate. The reaction mixture can comprise a melt transesterification catalyst, a dihydroxy compound, a diaryl carbonate, and a phenolic byproduct, and the reactor system can comprise a surface area in contact with the reaction mixture. The surface area in contact with the reaction mixture can contain a weld joining metal reactor system parts, all welds in contact with the reaction mixture join reactor system parts made from the same type of metal, and if a filler metal is contained in the weld, the filler metal is made from the same type of metal as the metal parts joined by the weld.

In various system and method embodiments set forth above: (i) the surface area in contact with the reaction mixture has no welds containing stainless steel; or (ii) the weld joins two reactor system parts made from stainless steel, wherein the weld is passivated prior to contact with the reaction mixture.

In another embodiment, a melt polymerization reactor system for producing polycarbonate comprises a surface area in contact with a reaction mixture. The reaction mixture comprises a melt transesterification catalyst, a dihydroxy compound, a diaryl carbonate, and a phenolic byproduct, and the surface area in contact with the reaction mixture has no welds containing stainless steel.

In the various embodiments set forth above, (i) the weld joins two reactor system parts made from nickel.

In an embodiment, a method of forming polycarbonate can comprise: using a melt polymerization reactor system, the reactor system comprising a surface area for contact with the reaction mixture, wherein (A) the surface area in contact with the reaction mixture contains a weld joining two pieces of stainless steel; (B) passivating the weld; and (C) after steps (A) and (B), treating a reaction mixture in the melt polymerization reactor system under melt polymerization conditions sufficient to produce polycarbonate, wherein the reaction mixture comprises a melt transesterification catalyst, a dihydroxy compound, a diaryl carbonate, and a phenolic byproduct; and forming the polycarbonate.

In yet another embodiment, a melt polymerization reactor system for producing polycarbonate comprises a surface area in contact with a reaction mixture. The reaction mixture comprises a melt transesterification catalyst, a dihydroxy compound, a diaryl carbonate, and an phenolic byproduct; and the surface area in contact with the reaction mixture contains a weld joining two pieces of stainless steel, wherein the weld is passivated prior to contact with the reaction mixture.

In the various system and method embodiments set forth above, the dihydroxy compound comprises a dihydric phenol having the following structure:

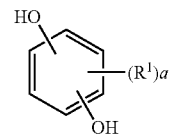

wherein $R^1$ is independently at each occurrence a hydrogen atom, halogen atom, nitro group, cyano group, $C_1$-$C_{20}$ alkyl radical, $C_4$-$C_{20}$ cycloalkyl radical, or $C_6$-$C_{20}$ aryl radical, and a is an integer from 0 to 4; and/or (ii) the dihydric phenol comprises hydroquinone, resorcinol, methylhydroquinone, butylhydroquinone, tertiary butyl hydroquinone, phenylhydroquinone, 4-phenylresorcinol, 4-methylresorcinol, or a combination comprising at least one of the foregoing; and/or (iii) the diaryl carbonate comprises an ester-substituted diaryl carbonate and the phenolic byproduct comprises an ester-substituted phenol; and/or (iv) the ester-substituted diaryl carbonate comprises bismethylsalicylcarbonate and the ester-substituted phenol comprises methyl salicylate, and wherein the dihydric phenol comprises hydroquinone, resorcinol, methylhydroquinone, butylhydroquinone, tertiary butyl hydroquinone, phenylhydroquinone, 4-phenylresorcinol, 4-methylresorcinol, or a combination comprising at least one of the foregoing; and/or (v) the ester-substituted diaryl carbonate comprises bismethylsalicylcarbonate and the ester-substituted phenol comprises methyl salicylate.

In the various method claims set forth above, (i) the treating of the reaction mixture in a melt polymerization reactor system operating under melt polymerization conditions, is performed at a temperature of 100° C. to 400° C., specifically the treating of the reaction mixture in a melt polymerization reactor system operating under melt polymerization conditions, is performed at a temperature of 150° C. to 325° C.

The invention claimed is:

1. A melt polymerization reactor system for producing polycarbonate, the reactor system comprising a surface area in contact with a reaction mixture, wherein:
 (I) the reaction mixture comprises a melt transesterification catalyst, a dihydroxy compound, an ester-substituted diaryl carbonate, and an ester-substituted phenol,
 (II) the surface area in contact with the reaction mixture contains a weld joining metal reactor system parts,
 (III) all welds in contact with the reaction mixture join reactor system parts made from the same type of metal, and
 (IV) a filler metal is contained in the weld, the filler metal is made from the same type of metal as the metal parts joined by the weld.

2. The reactor system of claim 1, wherein the surface area in contact with the reaction mixture has no welds containing stainless steel.

3. The reactor system of claim 1, wherein the weld joining two reactor system parts is made from stainless steel, wherein the weld is passivated prior to contact with the reaction mixture.

4. A melt polymerization reactor system for producing polycarbonate, the reactor system comprising a surface area in contact with a reaction mixture, wherein:
 (I) the reaction mixture comprises a melt transesterification catalyst, a dihydroxy compound, an ester-substituted diaryl carbonate, and an ester-substituted phenol,
 (II) the surface area in contact with the reaction mixture has no welds containing stainless steel.

5. The reactor system of claim 1, wherein the weld joins two reactor system parts made from nickel.

6. A method of forming polycarbonate comprising:
treating a reaction mixture in a melt polymerization reactor system operating under melt polymerization conditions sufficient to produce polycarbonate, and
forming the polycarbonate;
wherein:
(A) the reaction mixture comprises a melt transesterification catalyst, a dihydroxy compound, an ester-substituted diaryl carbonate, and a an ester-substituted phenol, and
(B) the reactor system comprises a surface area in contact with the reaction mixture, wherein:
(I) the surface area in contact with the reaction mixture contains a weld joining metal reactor system parts,
(II) all welds in contact with the reaction mixture join reactor system parts made from the same type of metal, and
(III) a filler metal is contained in the weld, the filler metal is made from the same type of metal as the metal parts joined by the weld.

7. The method claim 6, wherein the weld joining two reactor system parts is made from stainless steel, wherein the weld is passivated prior to contact with the reaction mixture.

8. The method of claim 6, wherein the weld joins two reactor system parts made from nickel.

9. The method of claim 6, wherein the surface area in contact with the reaction mixture has no welds containing stainless steel.

10. The method of claim 6, wherein the treating of the reaction mixture in a melt polymerization reactor system operating under melt polymerization conditions, is performed at a temperature of 100° C. to 400° C.

11. The method of claim 6, wherein the dihydroxy compound comprises a dihydric phenol having the following structure:

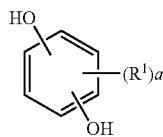

wherein $R^1$ is independently at each occurrence a hydrogen atom, halogen atom, nitro group, cyano group, $C_1$-$C_{20}$ alkyl radical, $C_4$-$C_{20}$ cycloalkyl radical, or $C_6$-$C_{20}$ aryl radical, and a is an integer from 0 to 4.

12. The method of claim 11, wherein the dihydric phenol comprises hydroquinone, resorcinol, methylhydroquinone, butylhydroquinone, tertiary butyl hydroquinone, phenylhydroquinone, 4-phenylresorcinol, 4-methylresorcinol, or a combination comprising at least one of the foregoing.

13. The method of claim 11, wherein the ester-substituted diaryl carbonate comprises bismethylsalicylcarbonate and the ester-substituted phenol comprises methyl salicylate, and wherein the dihydric phenol comprises hydroquinone, resorcinol, methylhydroquinone, butylhydroquinone, tertiary butyl hydroquinone, phenylhydroquinone, 4-phenylresorcinol, 4-methylresorcinol, or a combination comprising at least one of the foregoing.

14. The method of claim 6, wherein the ester-substituted diaryl carbonate comprises bismethylsalicylcarbonate and the ester-substituted phenol comprises methyl salicylate.

* * * * *